US007924279B2

(12) United States Patent
Gerritsen et al.

(10) Patent No.: US 7,924,279 B2
(45) Date of Patent: Apr. 12, 2011

(54) PROTOCOL-BASED VOLUME VISUALIZATION

(75) Inventors: Frans Andreas Gerritsen, Eindhoven (NL); Steven Lobregt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1095 days.

(21) Appl. No.: 10/539,387

(22) PCT Filed: Dec. 3, 2003

(86) PCT No.: PCT/IB03/05701
§ 371 (c)(1),
(2), (4) Date: Jun. 15, 2005

(87) PCT Pub. No.: WO2004/057539
PCT Pub. Date: Jul. 8, 2004

(65) Prior Publication Data
US 2007/0053553 A1 Mar. 8, 2007

(30) Foreign Application Priority Data

Dec. 20, 2002 (EP) .................................... 02080518

(51) Int. Cl.
*G06T 17/00* (2006.01)
(52) U.S. Cl. ....................................................... 345/424
(58) Field of Classification Search .................. None
See application file for complete search history.

(56) References Cited

U.S. PATENT DOCUMENTS

| 5,566,282 | A | 10/1996 | Zuiderveld | |
|---|---|---|---|---|
| 5,986,662 | A * | 11/1999 | Argiro et al. .................. | 345/424 |
| 6,532,017 | B1 * | 3/2003 | Knittel et al. .................. | 345/424 |
| 6,690,371 | B1 * | 2/2004 | Okerlund et al. .............. | 345/424 |
| 7,149,564 | B2 * | 12/2006 | Vining et al. .................. | 600/425 |
| 2003/0160788 | A1 * | 8/2003 | Buehler ........................ | 345/422 |
| 2004/0125103 | A1 * | 7/2004 | Kaufman et al. .............. | 345/419 |

OTHER PUBLICATIONS

Avila, R., He, T., Hong, L., Kaufman, A., Pfister, H., Silva, C., Sobierajski, L., Wang, S., VolVis: a diversified volume visualization system, Oct. 1994, Proceedings of the conference on Visualization '94, pp. 31-38.*
Corrie, B., et al.; Data Shaders; 1993; IEEE Trans. on Visualization; pp. 275-282.
Robb, R. A.; Visualization in biomedical computing; 1999; Parallel Computing; 25:2067-2110.
Lakare, S., et al.; 3D Digital Cleansing Using Segmentation Rays; 2000; IEEE Trans. on Visualization; pp. 37-44.

(Continued)

*Primary Examiner* — Said Broome (57) ABSTRACT

A system for visualizing a 3D volume, in particular for medical applications, includes an input 1010 for receiving a three-dimensional set of data representing voxel values of the 3D volume. The data set is stored in a storage 1030. A processor projects the volume onto an imaginary 2D projection screen from a predetermined viewpoint. For each pixel of the 2D projection image a ray is cast through the pixel and through the volume. A protocol is used that, while traversing along ray positions within the volume, determines a rendering algorithm and/or rendering parameters in dependence on the ray position. For each ray position the determined rendering algorithm/parameters are used to calculate a contribution to a pixel value of the pixel based on at least one voxel value within a predetermined range of the ray position. An output 1040 is used for providing pixel values of a 2D image for rendering on a display.

13 Claims, 6 Drawing Sheets

OTHER PUBLICATIONS

Wan, M., et al.; Volume Rendering Based Interactive Navigation within the Human Colon; 1999; IEEE Trans. on Visualization; pp. 397-549.

Zuiderveld, K. J., et al.; Multimodality Visualization of Medical Volume Data; 1996; Computers and Graphics; 20(6) 775-791.

* cited by examiner

PROTOCOL-BASED VOLUME VISUALIZATION

The invention relates to a system for visualizing a three-dimensional (hereinafter "3D") volume, in particular for medical applications. The invention also relates to software for use in such systems. The invention further relates to a method of visualizing a three-dimensional 3D volume.

Figure 1:
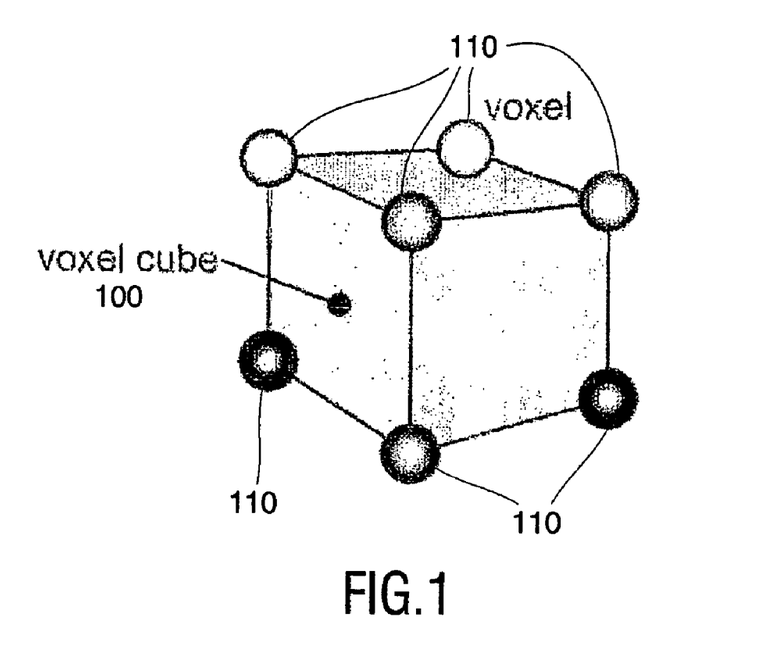
FIG. 1 shows a voxel cube.

With the increasing power of digital processing hardware (in the form of dedicated pre-programmed hardware or a programmable processor) it has become possible to exploit rendering algorithms in actual systems for generating high-quality images from volumetric data sets. For medical applications, the volumetric data sets are typically acquired using 3D scanners, such as CT (Computed Tomography) scanners or MR (Magnetic Resonance) scanners. A volumetric data set consists of a three dimensional set of scalar values. The locations at which these values are given are called voxels, which is an abbreviation for volume element. The value of a voxel is referred to as the voxel value. FIG. 1 shows a cube 100 surrounded by eight voxels 110. The cube will be referred to as voxel cube or cell.

In medical scanners, typically the data is organized slice by slice, where each slice is two-dimensional. The data in a slice can be represented as gray values. A stack of slices form the 3D data set. A known, relatively simple technique to visualize the contents of a 3D data set is called multi-planar reformatting. This technique can be used to generate arbitrary cross sections through the volumetric data by 're-sampling' voxels in the cross section from the neighboring voxels in the 3D data set. In most cases, flat 2D cross sections are used. In principle, also other curved cross sections can be generated. This technique enables an operator to view an image independent of the direction in which the data was acquired.

Figure 2:
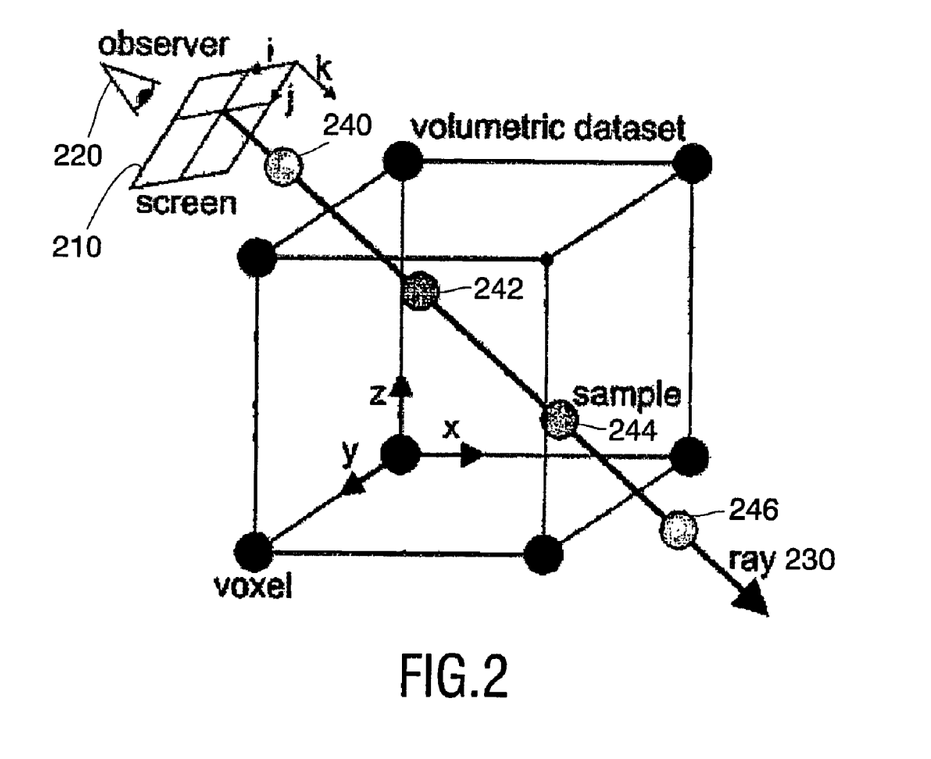
FIG. 2 illustrates ray-casting volume visualization techniques.

FIG. 2 illustrates a more sophisticated volume visualization algorithms that take as input the entire discrete data field and projects this data field onto a two-dimensional screen 210. Bach projection is from a predetermined view point 220 that may be selectable by a user or may be dynamically changed (e.g. giving a virtual tour through the volume). This is achieved by casting a ray 230 from the view point through each pixel (i, j) of the imaginary projection screen and through the data field. At discrete k locations 240, 242, 244, 246 along the ray, indicated in light gray, the data is re-sampled from neighboring voxels. Various rendering algorithms are known for calculating a pixel value for pixel (i, j) in dependence on voxels that are near the ray locations in the volume. Examples of such rendering algorithms are surface rendering, volume rendering and iso-surface rendering.

Figure 3A:
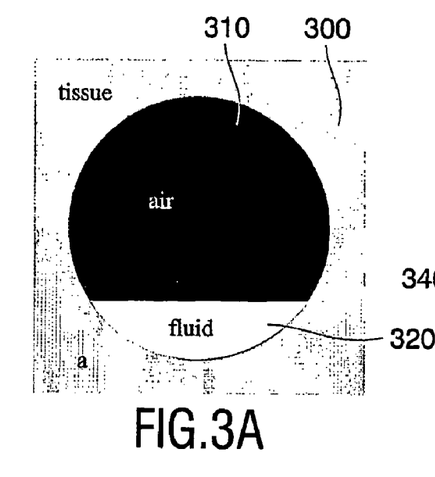
FIG. 3 illustrates problems with current rendering algorithms.
Figure 3B:
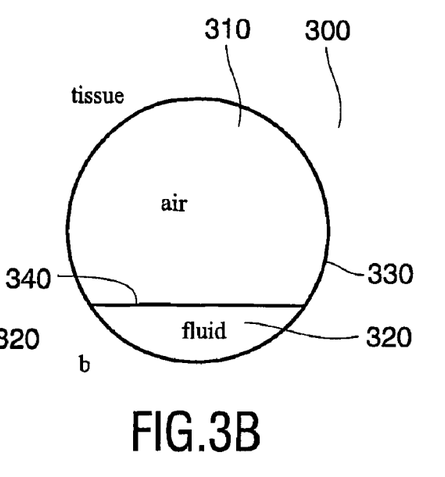

The above-described rendering algorithms have in common, that the visualization results are based on local calculations on the path of a ray, depending only on low-level information like the local gray-value distribution or the local shape of a surface as determined from the data set. This may result in undesired rendering results. As an example, its is highly desirable to be able to visualize the inner surface of the colon for inspection and possible detection of polyps. As a result of preparation before acquisition of the data set, the colon may be partly filled with residues of contrast fluid as illustrated in FIG. 3. In FIG. 3A, the tissue surrounding the colon is shown as 300. The part of the colon filled with air is indicated as 310 and the part filled with contrast fluid as 320. None of the above described rendering algorithms are able to fully automatically produce the correct visual representation. The problem is caused by the fact that here is that the fluid may obstruct the view on part of the colon surface. FIG. 3B illustrates a visualization result obtained by current rendering algorithms. The colon surface 330 is shown but also the surface 340 between the air 310 and liquid 320. This obscures the outcome. A common way to avoid or repair some of these artifacts is to perform pre- or post-processing steps to manipulate or modify gray-values, segmentations or visualization results (e.g. remove the boundary between the fluid and air in the colon. Such steps are performed under control of a human operator who may apply higher-level knowledge of a non-local nature to improve the rendering. This requires a lot of effort and skill. Moreover, it may lead to subjective results that may not be reproducible if the same processing is performed repeatedly under control of a same or different human operator.

It is an object of the invention to provide an improved system and method for visualizing a 3D volume.

To meet the object of the invention, a system for visualizing a three-dimensional (hereinafter "3D") volume, in particular for medical applications, includes an input for receiving a three-dimensional set of data representing voxel values of the 3D volume; a storage for storing the data set; an output for providing pixel values of a two-dimensional (hereinafter "2D") image for rendering; and a processor for, under control of a computer program, processing the data set to obtain a 2-dimensional representation of the volume by projecting the volume onto an imaginary 2D projection screen from a predetermined viewpoint by for each pixel of the 2D projection image:

casting a ray from the viewpoint through the pixel and through the volume;

traversing along the ray through at least a plurality of ray positions within the volume under control of a protocol that determines a rendering algorithm and/or rendering parameters in dependence on the ray position; and for each of the plurality of ray positions using the determined rendering algorithm/parameters to calculate a contribution to a pixel value of the pixel based on at least one voxel value within a predetermined range of the ray position.

According to the invention, a protocol is used that determines the rendering to be used for the ray positions. In this way, higher level knowledge can be applied automatically during the rendering. This increases speed and reduces costs. Moreover, the results become reproducible. This opens ways for improvement of the protocol being used and/or the rendering algorithm being used.

According to the measure as described in the dependent claim 2, the protocol reflects a-priori knowledge of the volume being rendered; the a-priori knowledge being at least one of the following: the volume, the medical situation, the clinical situation. For example, if the volume represents a human head the protocol may include information on a cranial thickness range and steer the rendering accordingly.

As described in the measure of the dependent claim 3, the a-priori knowledge is preferably derived from a 3D model of object(s) in the volume. For example, a human operator may control the generation of a protocol by simulating the rendering performed under control of the protocol using the model. The operator may indicate areas in the model, e.g. the cranium, that should be skipped during the rendering of a real volume. Automatically information, such as a typical range of cranial thickness can be extracted from the model and embedded in the protocol. By using a model, additional information, such as average values, ranges, etc. can be made available to the operator to assist in the creation of the protocols. Moreover, areas that are difficult to visualize can be identified in the model to assist the operator in designing an optimal protocol for those areas. Such a model needs to be created only once and can be used for generating many different protocols. The model may also be used for other purposes, such as segmentation.

As described in the measure of the dependent claim 4, a rule-based protocol is used. Using rules is an easy and effective way for representing higher-level knowledge for processing of ray positions.

As described in the measure of the dependent claim 5, the rule determines for each ray position a processing action based on the outcome of the already processed ray positions. In this way, the protocol adapts to the volume being rendered.

As described in the measure of the dependent claim 6, the action may involve one or more of the following:

skipping one or more next ray positions, for example if it can be concluded that these positions do not contribute to the desired rendering outcome. Skipping positions improves performance.

jumping forward or backward along a ray to a particular position on the ray, and resume processing from that position switching the stepping direction along a ray between forward and backward as seen from the viewpoint.

changing the 3-dimensional direction of a ray starting from a particular position.

switching to another feature detection method, which determines the type of information that is going to be visualized by the rendering process. Such features may include voxel value above a predetermined threshold, position of iso-value surfaces, position of surfaces indicating the location of local gradient maxima, center-line positions of elongated structures, such as blood vessels, distances between surfaces or structures, diameters of blood vessels, parameters that represent functioning of tissue, such as perfusion of the brain or heart muscle, etc. In general, a feature is calculates in dependence on voxel values and in dependence on the feature a sub-volume of the data set is determined for subsequent rendering as a 3D structure. The value of the feature can also be used for selecting, for example, a color or transparency applied to the rendered structure, when the structure itself is based on another feature. For example, the rendering of bone structures, such as a cranium, based on gray-values above a predetermined threshold, with on the surface of the bone structure a color indicating a local thickness of the bone (distance between the outer and inner iso-surface). Another example is the projection of blood vessels (based on gray-values of a contrast liquid in the blood) with on the wall of the blood vessels a color that is related to a local diameter of the blood vessel (distance between outer surface and center line).

switching to another rendering algorithm; in this way an optimal rendering algorithm can be chosen for individual rays or even segments or positions of the ray, improving the rendering quality.

adapting of rendering parameters, such as transparency, color related to properties assigned to visualized objects or related to local or global image data features, lighting parameters related to the simulated illumination conditions, shading parameters related to the reflective properties of visualized object surfaces, parameters that determine the smoothness of visualized object surfaces (like blurring function coefficients for reducing noise in voxel based data, or tension parameters to smooth synthetic surfaces), feature detection parameters. In this way the loaded rendering algorithm can be tuned optimally for individual rays or even segments or positions of the ray, improving the rendering quality.

changing the step size for stepping to a next position on a ray; in this way the accuracy can be decreased or increased depending on the circumstances.

As described in the measure of the dependent claim 7, the system may include several protocols, for example a specific protocol for each type of volume, such as a head, heart, lung, colon, etc. It may also include several protocols for one type of volume, where each of the protocols may be designed to optimize the rendering of a specific aspect of the volume, a different age or gender of the patient being visualized, etc. It may also include several protocols which are optimized with respect to particular diagnostic or therapeutic procedures, for instance analysis of specific cardiac functions or planning of surgical procedures.

As described in the measure of the dependent claim 10, the protocol is selectable by a human operator, enabling the operator to control the system by selecting a most appropriate protocol (e.g. corresponding to age/size of patient) or trying one or more of the protocols until an optimal result has been achieved.

As described in the measure of the dependent claim 11, a human operator can store his/her favorite protocols for subsequent use by the operator. For example, the favorite protocol may be loaded automatically each time the operators logs-in or starts a rendering task.

Preferable, as described in the measure of the dependent claim 12, the operator can define and/or adapt a protocol to suit his/her requirements and save the adapted protocol for subsequent use.

These and other aspects of the invention are apparent from and will be elucidated. As described in the measure of the dependent claim 3 with reference to the embodiments described hereinafter.

The system for visualizing volumes and a method of doing so will be described for medical applications. It will be appreciated that the system and method can also be applied for other applications as well, in general for inspection of the inner parts and structure of all objects which can be measured with a system, characterized by the fact that processing of the measurements results in a 3-dimensional dataset (3D array of measurements) representing a (part of the) volume of the object, and in which each data element or voxel relates to a particular position in the object and has a value which relates to one or more local properties of the object, for example for X-ray inspection of objects that can not be opened easily in the time available. To describe the system and method according to the invention, first an overview of volume visualization algorithm is given, followed by an example of a visualization task with which those algorithms can not easily cope without assistance of a human operator.

Figure 4A:
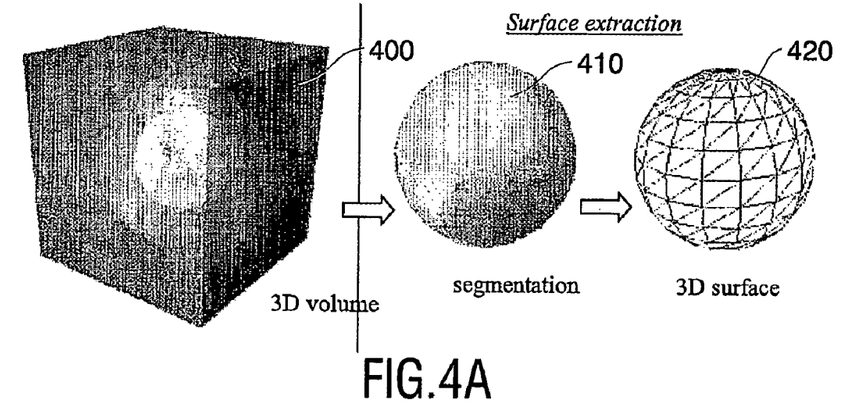
FIGS. 4A and B illustrate surface rendering.
Figure 4B:
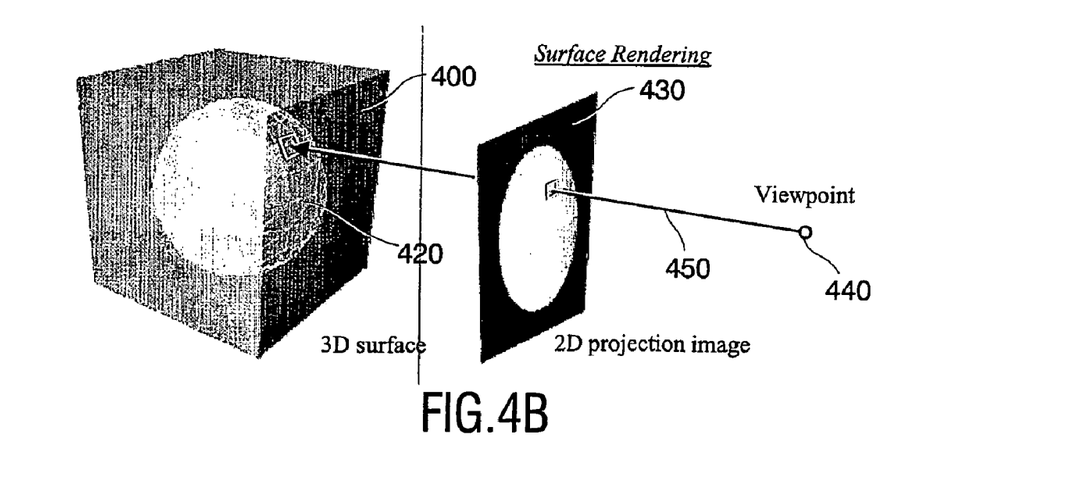

Main approaches to volume visualization that are currently applied are surface rendering, volume rendering and iso-surface rendering. Surface rendering is characterized by the fact that some kind of description of a surface is available or generated and that the value which is assigned to a pixel of the projection image depends on the local surface shape at the position where the corresponding ray hits this surface. FIG. 4A shows that the surface description can be derived from the gray-value volume 400, usually by doing a binary segmentation 410 (which means loss of information) followed by description 420 of the separating surfaces, for instance by a triangulation mesh. The surface description may also represent a computer-generated shape for instance like the shape description of a surgical instrument which is to be visualized together with anatomical data. FIG. 4B illustrates that the value, which is assigned to a pixel of the projection plane/screen 430 from viewpoint 440, may include an object specific color and components, which depend on the local gray-value and gradient (for instance simulated illumination of the surface by a virtual light source where the local gray-value gradient is used as an approximation of the local surface orientation). This is done by casting a ray 450 from the viewpoint 440. The corresponding projection plane pixel value is calculated from a limited environment of the location where the ray hits the surface 420.

Figure 5:
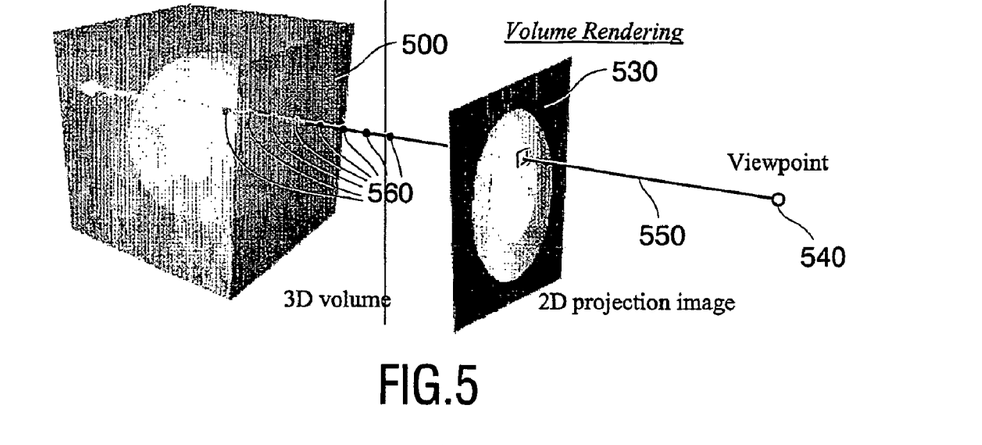
FIG. 5 illustrates volume rendering.

Volume Rendering is characterized by the fact that there is no segmentation and also no extraction of a surface or storage of a surface description. Image features are interpolated from the volume 500 on the fly, while stepping along the rays at regularly spaced discrete ray locations FIG. 5 illustrates 13 ray locations 560 along the ray 550. As before, the ray leaves the viewpoint 540 through a pixel of the screen 530. The contents of a predetermined look-up table for opacity and color determine how materials or transitions between materials will be visualized. Merging the sampled values can be done in a number of ways adapted to the required result. Some examples are MIP (Maximum Intensity Projection) and Alpha Blending (traditional volume rendering). Also in this rendering technique, only local information (limited number of voxels around each sample position) contributes to the calculated sample values.

Figure 6A:
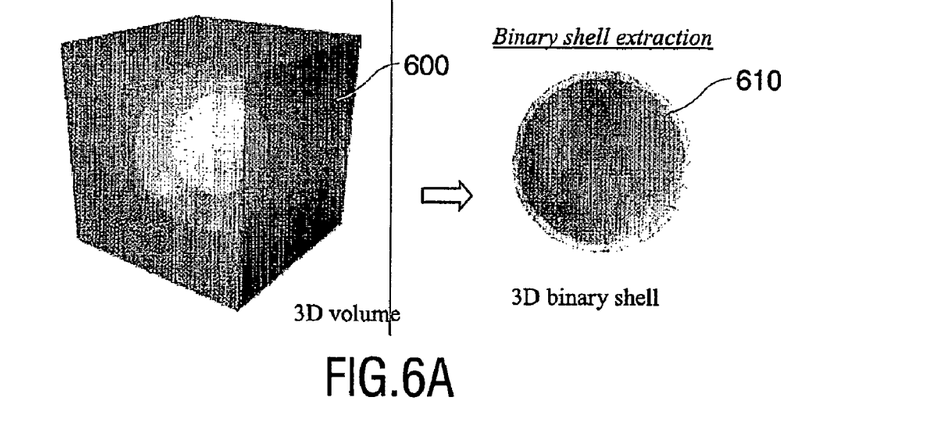
FIGS. 6A and B illustrate iso-surface rendering.
Figure 6B:
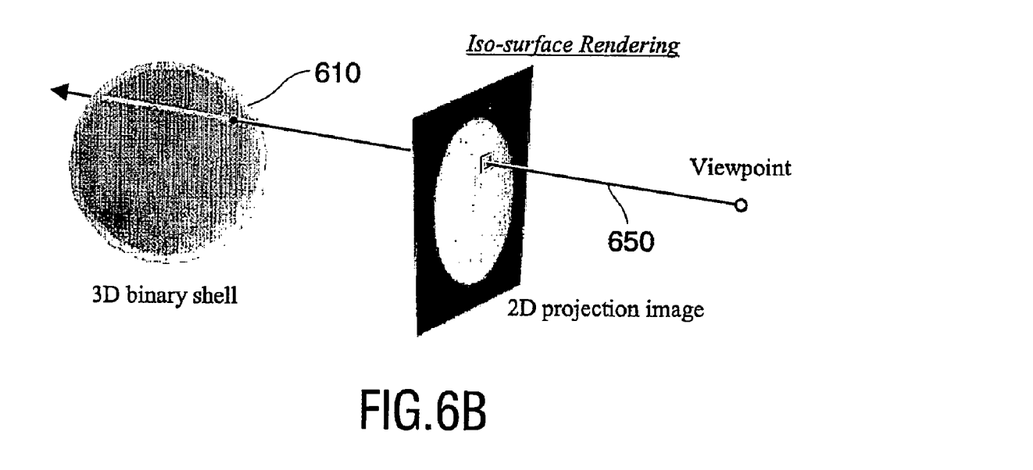

Iso-surface Rendering is a third volume visualization technique, illustrated in FIGS. 6A and B. It does not include a segmentation and does not determine or store any kind of surface description, just like the Volume Rendering approach. Nevertheless, it is able to visualize surfaces, just like the Surface Rendering approach. The resolution of the visualized surfaces is very high, as the visualization is produced directly from the original gray-value distribution, and not limited by a predetermined approximation of the surface in the form of some kind of surface description. In a preferred implementation, the method includes a pre-processing step in which a so-called binary shell 610 is determined, which represents a minimum sub-volume of the volume 600 that contains the desired surface. This reduces the volume to be processed as processing for each ray 650 takes place only where it crosses this binary shell 610, greatly reducing the required computations, which makes this an extremely fast method. Only a very limited number of samples are required on each ray to determine the location of the iso-surface inside the binary shell.

Figure 7A:
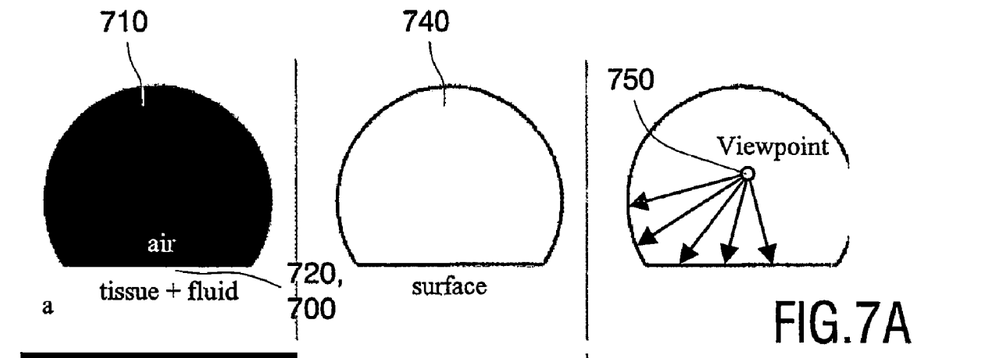
FIG. 7 illustrates problems with existing rendering algorithms.
Figure 7B:
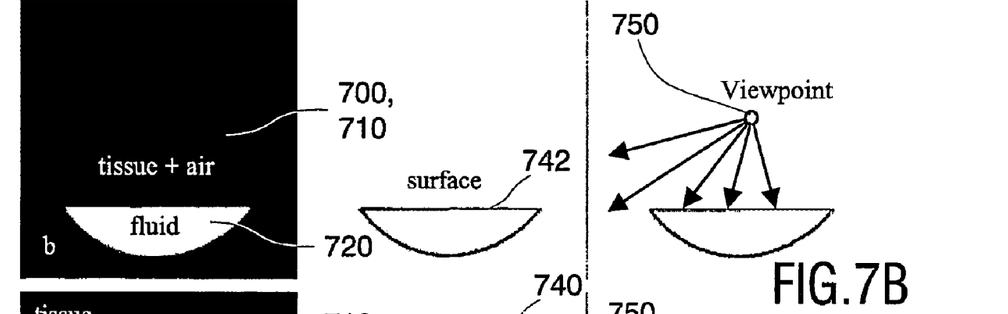
Figure 7C:
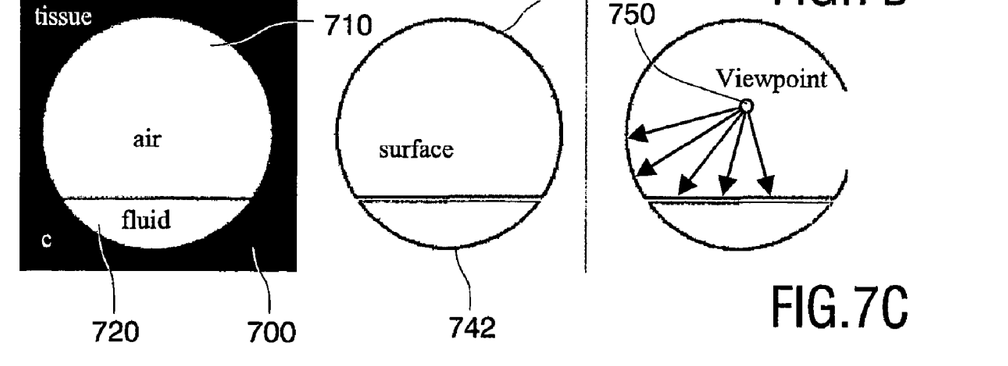
Figure 8:
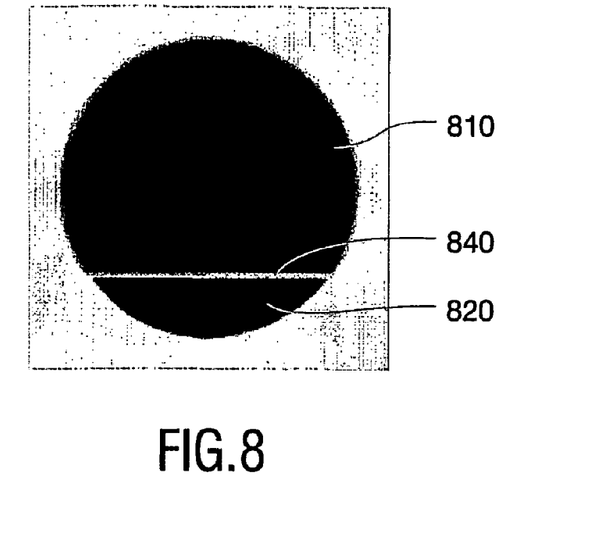
FIG. 8 shows a result obtained after human intervention.

The above-described approaches have in common, that the visualization results are based on local calculations on the path of a ray, depending only on low-level information like the local gray-value distribution or the local shape of a surface. Often, high-level knowledge is available about expected or possible shapes or configurations of the visualized objects (e.g. some kind of model). This information is, however, not used in currently applied approaches. Not taking advance of available high-level knowledge can lead to significant errors in the visualization results, which may not always be obvious to the observer. This is illustrated further in FIG. 7 with reference to the problem already described for FIG. 3. In the example, the visualization of a colon, which is partly filled with contrast fluid, will be discussed. The goal is to visualize the inner surface of the colon for inspection and possible detection of polyps. The problem here is that, depending on the settings of the visualization parameters, the fluid may obstruct the view on part of the colon surface. Using the known surface rendering technique, the first step is to segment the volume of the colon cavity from its surroundings, in order to generate a surface description. This is, however not a trivial matter in this case. FIG. 7 shows the viewpoint indicated by number 750. The tissue is indicated by 700, the air in the colon by 710, the liquid in the colon by 720. Choosing a threshold optimized for the tissue-air transition (major part of the colon surface), gives as a result the surface 740 as shown in FIG. 7A. Part of the colon surface is invisible. Choosing a high threshold to create a surface at the tissue-fluid transition, the resulting surface 742 is as shown in FIG. 7B. Use high and low thresholds, surfaces are created at both transitions, but also still at the fluid-air transition, as shown in FIG. 7C. The problem is caused by voxels in this fluid-air transition region which have gray-values in the same range as the tissue values, because of partial volume effects and PSF (point spread function) in the data acquisition/reconstruction process. Direct surface rendering from these segmentation results is not possible, because undesired surfaces would be visible and obstruct the view on the colon surface. Of course, it is possible to further process these results to try to remove the undesired surfaces using (semi-)interactive manual procedures, which require (too) much time, effort and skill to be practical. For the same reason, it is not desirable to remove the fluid volume from the patient data previous to segmentation/surface generation. Global selection of the fluid volume based on its gray-value, followed by filling in the selected volume with the gray-value corresponding to air, would give a result as shown in FIG. 8 showing the liquid filled part 820, the air filled part 810 and the separating surface 840.

The problem with Volume Rendering is very similar to that with Surface Rendering. In this case, the gray-values are mapped to opacity values. To inspect the colon surface, the gray-values, which represent soft tissue, should be mapped to opacity values close to 1. The voxels in the transition area between fluid and air, and with gray-values in the same range as soft tissue would also in this case obstruct the view.

Also with Iso-surface Rendering the problem remains. Because the extracted binary shell is based on gray-value selection, it will not only contain the surface at the tissue-air transition and the tissue-fluid transition, but also the surface at the fluid-air transition.

The general problem is that it is not possible to distinguish between voxels belonging to the tissue, which we are looking for, and other voxels with similar gray-value, based on local information only.

Advanced Volume Visualization

In the system according to the invention, the ray is traversed through at least a plurality of ray positions within the volume under control of a protocol. The protocol determines a rendering algorithm and/or rendering parameters in dependence on the ray position. So, the actual position along the ray, through the protocol, automatically controls the selection of the rendering algorithm and/or control the rendering algorithm. In itself any suitable ray-casting rendering algorithm may be used, including the ones described above. The invention adds using such algorithms under control of an automatic protocol that reduces (and preferably avoids) post-processing by a human operator. Moreover, using the same protocol on the same volume will yield the same results, making the results of the technique reproducible.

Preferably, the protocol is based on a-priori knowledge of at least one of the following: the volume, the medical situation, the clinical situation. In this way, the above-mentioned problems are reduced by integrating a priori knowledge about the visualized volume into the visualization process itself This a priori knowledge may for instance result from a model that is available for the situation being investigated. As such, the a-priori knowledge may be derived from a 3D model of at least one object in the volume, e.g. of a 3D model of the cranium or of the brains for a volume representing a head. The a-priori knowledge need not be a tangible or computer representation of a 3D tangible model, but may also represent anatomical, medical, and/or clinical knowledge and/or experience of a medical expert.

Preferably, the protocol is rule based. A rule may, for example, prescribe for the ray positions at least one processing action in dependence on processing results of ray position along the ray that have already been processed. Such a processing action is preferably, one or more of the following:

jumping forward or backward along a ray to a particular ray position, and resuming processing from that position;
switching a stepping direction along a ray between forward and backward as seen from the viewpoint;
changing a step size that determines a next ray position with respect to a current ray position in the stepping direction;
changing a 3-dimensional direction of a ray starting from a particular position;
switching to another rendering algorithm;
adapting rendering parameters for controlling the rendering algorithm;
switching to another feature detection method, which determines the type of information that is going to be visualized by the rendering algorithm;

The rules can be built into 'smart' visualization protocols, at a level above the actual visualization functions. The different available visualization techniques (surface rendering, alpha blending, MIP, . . . ) and related pre-processing steps such as binary segmentation or binary shell extraction, can be included in the visualization protocols of the proposed technique.

Figure 9A:
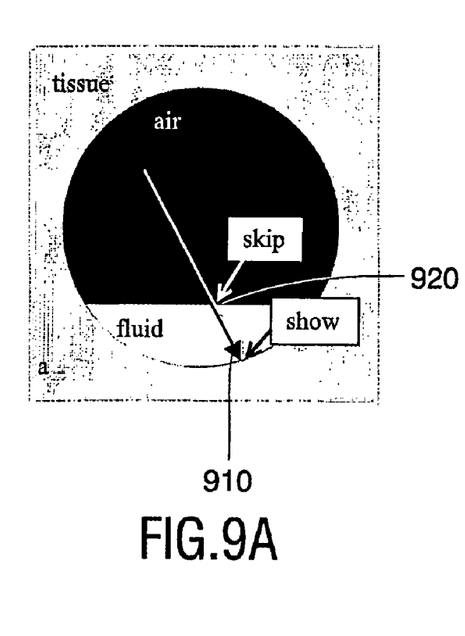
FIG. 9 illustrates using the protocol according to the invention.
Figure 9B:
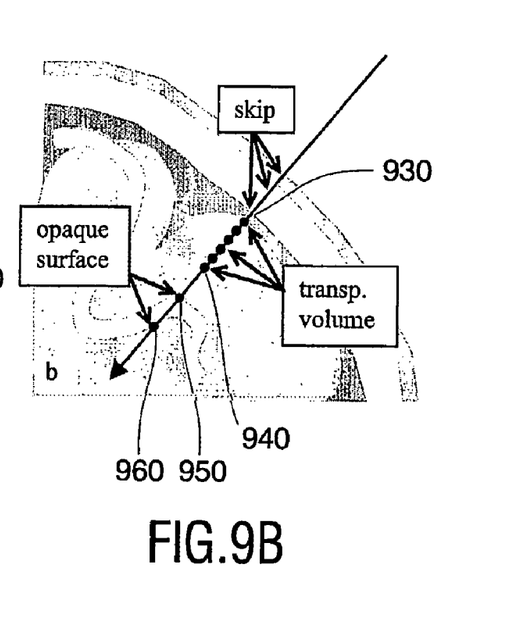

A simple example of a rule with respect to the colon visualization discussed above is illustrated in FIG. 9A. The rule describes that when a transition between materials is encountered along the ray, features of this transition like the grayvalues on both sides can be analyzed, and only if they correspond to an air-tissue interface or a fluid-tissue interface, this surface should be visualized (applies to transition 910), else the process should advance to the next encountered transition. So, the transition 920 will be skipped. FIG. 9B illustrates that a visualization protocol can also be derived from somewhat more complex visualization requirements. The example illustrates the requirement to visualize the brain cortex together with underlying vessel structures. In this case, the visualization protocol could be described as something like: 'skip everything until the bone-CSF interface is encountered, from there on do a 50% transparent volume rendering of brain tissue from the cortex surface to a depth of 1 cm below it (end point 940), combined with an opaque surface visualization of all vessel structures (are 950 to 960) inside the cranium'. Persons skilled in the art will be able to implement such protocols in a way that they can be processed automatically.

The history of the visualization process along the ray plays an important role in this method according to the invention. The current situation is analyzed and interpreted taking this history into account. It is also preferred that the protocol has the capability to dynamically adapt the visualization parameters, or switch to other visualization modes, if such is required.

Advantage over prior art rendering algorithms

In currently applied methods, visualization results are based on local computations. A common way to make use of higher-level knowledge of a non-local nature is to go through interactive pre- or post-processing steps to manipulate or modify gray-values, segmentations or visualization results. This requires a lot of effort and skill, and leads to subjective, non-reproducible results. The system and method according to the invention, open the door to new ways of producing high quality volume visualizations by using higher-level knowledge about the visualized objects, such as a priori knowledge, statistical information about shapes and configurations, and even dynamically generated analysis results, as an integrated part of the visualization process. It replaces expensive effort in time-consuming interactive procedures, with relatively low-cost effort in the design of protocols.

Figure 10:
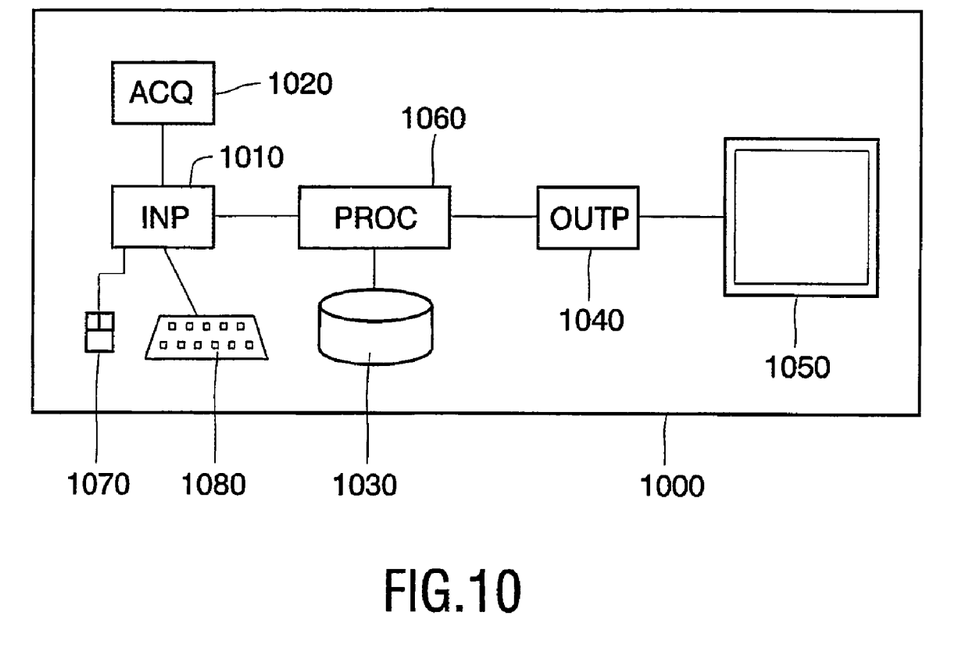
FIG. 10 shows a block diagram of the system according to the invention.

FIG. 10 shows a block diagram of the system according to the invention. The system may be implemented on a conventional computer system such as a workstation or high-performance personal computer. The system 1000 includes an input 1010 an input for receiving a three-dimensional set of data representing voxel values of the 3D volume. The data may be supplied via a conventional computer network, such as Ethernet, or telecommunications network, either wired or wireless, or combinations thereof, or via computer peripherals for reading common information carriers for magnetic or optical recording such as tapes, CD's, DVD's and the like, including solid state memories, such as flash memory. In FIG. 10, the image is acquired by an image acquisition device 1020, such as a medical MR or CT scanner. Such acquisition device may be part of the system, but may also be external to the system. The system includes a storage 1030 for storing the data set. Preferably, the storage is of a permanent type, such as a hard disc. An output 1030 of the system is used for providing pixel values of a two-dimensional image for rendering. It may supply the image in any suitable form, for example as a bit-mapped image through a network to another computer system for display. Alternatively, the output may include a graphics card/chip set for direct rendering of the image on a suitable display 1050. The display may, but need not be part of the system. The system may be able to provide simultaneously two 2D images for stereoscopic display. If so, two images are produced from two different viewpoints, each corresponding to a respective eye of a viewer. The system further includes a processor 1060 for, under control of a computer program, processing the data set to obtain a 2-dimensional representation of the volume. The program may be loaded from a permanent storage, such as storage 1030, into a working memory, such a RAM for execution. The processor 1060 is operative to projects the volume onto an imaginary 2D projection screen from a predetermined viewpoint by for each pixel of the 2D projection image:

casting a ray from the viewpoint through the pixel and through the volume;
traversing along the ray through at least a plurality of ray positions within the volume under control of a protocol that determines a rendering algorithm and/or rendering parameters in dependence on the ray position; and
for each of the plurality of ray positions using the determined rendering algorithm to calculate a contribution to a pixel value of the pixel based on at least one voxel value within a predetermined range of the ray position.

In a preferred embodiment, the storage 1030 of the system includes a plurality of protocols for controlling the traversing along the ray. For example, the storage includes respective predetermined protocols for a plurality of distinct types of volumes. Alternatively or additionally, the storage includes for at least one type of volume a plurality of predetermined protocols, e.g. for different viewpoints, different visualization tasks, etc. The processor may be programmed to automatically determine a most suitable protocol, for example by testing the protocols and using heuristics to determine a most suitable one.

Preferably, the computer program is operative to cause the processor to enable a human operator to select at least one protocol from the plurality of stored protocols for processing the volume. To this end, the input 1010 can receive a selection of a protocol from a human operator. Such input may be received in any suitable form. Shown are a mouse 1060 and a keyboard 1080. Also voice control may be used. Preferably, the processor generates a graphical output, for example on display 1050, indicating (and preferably explaining) the protocols from which the operator may choose.

In a preferred embodiment, the computer program is operative to cause the processor to store a selection of a human operator in association with an identity of the operator for subsequent retrieval. For example, the selection may be stored in the permanent storage 1030 and automatically retrieved each time the operator logs-on.

Preferably, the computer program is operative to cause the processor to enable a human operator to define and/or adapt a protocol for processing the volume. This defining of a protocol may take any form. One way is to enable an operator to define actions to take for ranges of ray positions or for individual ray positions. The actions may all be predefined, where the operator selects the action through a menu. The defining may also be interactive. For example a model volume or real volume is visualized using a default protocol. The human operator can interactively adapt the protocol. For example, the operator may be able to indicate ray positions to be skipped, indicate ranges of ray positions to be processed using a specific rendering algorithm or specific rendering parameters, specify criteria, etc. Preferably, the operator can immediately test the adapted protocol. When a satisfactory result has been achieved, the operator can store the protocol for subsequent use.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in a claim. The invention can be implemented by means of hardware comprising several distinct elements, and by means of a suitably programmed computer. In the system claims enumerating several means, several of these means can be embodied by one and the same item of hardware. The computer program product may be stored/distributed on a suitable medium, such as optical storage, but may also be distributed in other forms, such as being distributed via a local area network, the public Internet, wired or wireless telecommunication systems.

The invention claimed is:

1. A system for visualizing a three-dimensional (hereinafter "3D") volume, in particular for medical applications; the system including:
   an input for receiving a three-dimensional set of data representing voxel values of the 3D image;
   a storage for storing the data set;
   an output for providing pixel values of a two-dimensional (hereinafter "2D") image for rendering; and
   a processor for, under control of a computer program, processing the data set to obtain a 2-dimensional representation of the volume by projecting the volume onto an imaginary 2D projection screen from a predetermined viewpoint by for each pixel of the 2D projection image:
   casting a ray from the viewpoint through the pixel and through the volume;
   traversing along the ray through at least a plurality of ray positions within the volume under control of a protocol that determines a rendering algorithm and/or rendering parameters in dependence on the ray position with the determined rendering algorithms and/or rendering parameters being different for some ray positions than the determined rendering algorithm and/or rendering parameters for other ray positions; and
   for each of the plurality of ray positions using a corresponding one of the determined rendering algorithms/parameters to calculate a contribution to a pixel value of the pixel based on at least one voxel value with a predetermined range of ray positions,
   wherein the protocol is rule-based;
   wherein a rule prescribes for each of the plurality of ray positions at least one processing action at least in dependence on processing results of ray position along the ray that already been processed wherein the processing action includes at least one of the following:
   jumping forward or backward along a ray to a particular ray position, and resuming processing from that position;
   switching a stepping direction along a ray between forward and backward as seen from the viewpoint;
   changing a step size that determines a next ray position with respect to a current ray position in the stepping direction;
   changing a 3-dimensional direction of a ray starting from a particular position;
   switching to another rendering algorithm;
   adapting rendering parameters for controlling the rendering algorithm;
   switching to another feature detection method, which determines the type of information that is going to be visualized by the rendering algorithm.

2. A system for visualizing a three-dimensional (hereinafter "3D") volume of a patient, the system including:
   an input which receives a three-dimensional set of medical image data representing voxel values of the 3D volume;
   at least one storage which stores protocols for switching among a plurality of feature detection methods and which stores the medical image data set;
   an output which provides pixel values of a two-dimensional (hereinafter "2D") image representation for rendering; and
   a processor which, under control of a computer program, processes the medical image data set to obtain the 2D image representation by performing the steps of:
   casting a ray from each pixel of the 2D image representation through the volume;
   traversing along each ray through at least a plurality of ray positions within the volume;
   in accordance with one of the stored protocols selected to select a type of information visualization, selecting one of the plurality of feature detection methods, in dependence on the ray position, the selected one of the plurality of feature detection methods changing with the ray position, the selected feature detection method being different for some of the ray positions of the 2D image than for other ray positions of said 2D image;

for each of the plurality of ray positions, calculating a contribution to a corresponding pixel value based on at least one voxel value within a predetermined range of the ray position using the selected one of the feature detection methods for each of the ray positions.

3. The system as claimed in claim 2, wherein the selecting of one of the plurality of feature detection methods is based on a-priori knowledge of at least one of the following: the volume, the medical situation, the clinical situation based on at least one of anatomical, medical and clinical knowledge of a medical expert.

4. The system as claimed in claim 2, further including a 3D model of at least one object in the volume, the used one of the plurality of feature detection methods being selected in accordance with a relationship between each ray position and the at least one object of the 3D model.

5. The system as claimed in claim 2, wherein the selected feature detection method is rule-based, such that based on a rule, a processing action is selected based on the ray position, the processing action being selected among:
stepping direction along the ray,
changing a step size over a portion of the ray,
changing a 3D direction of the ray starting at a selected ray position.

6. The system as claimed in claim 5, wherein a rule prescribes that, for each of the plurality of ray positions, at least one processing action changes in dependence on processing results of ray positions along the ray that have already been processed.

7. The system as claimed in claim 2, wherein each of the protocols corresponding to one of a plurality of anatomical regions of the patient.

8. The system as claimed in claim 2, wherein the computer program is operative to cause the processor to:
enable a human operator to select at least one protocol from the plurality of stored protocols for processing the volume; and
store a selection of the human operator in association with an identity of the operator for subsequent retrieval.

9. The system as claimed in claim 2, wherein the computer program is operative to cause the processor to change the selected feature detection method along the ray such that the corresponding pixel value is calculated using a plurality of feature detection methods.

10. A non-transitory computer readable storage medium storing a computer program for controlling a processor to process a three-dimensional set of medical data representing voxel values of a 3D volume depicting an anatomical region of a patient to obtain a 2D image having a plurality of pixels of the 3D volume by projecting the 3D volume onto an imaginary 2D projection screen by controlling the processor to perform the steps of:
from a memory which stores a plurality of rendering algorithms, selecting a subset of the rendering algorithms in accordance with an anatomical region depicted by the 3D volume;
casting a ray through each pixel of the 2D image and into the 3D volume;
stepping along the ray through a plurality of ray positions along the ray within the volume under control of a protocol that selects one of the subset of rendering algorithms to be implemented for each ray position along the ray, the rendering algorithm selected for some ray positions being different than the rendering algorithm selected for other ray positions along the ray; and
for each of the plurality of ray positions, using the selected rendering algorithm to calculate a contribution to a pixel value of the pixel corresponding to the ray based on at least one voxel value within a predetermined range of the ray position,
wherein a plurality of different rendering algorithms are used to generate the pixel values of the 2D image from the voxels of the 3D volume.

11. A method of visualizing a 3D volume representing an anatomical region of a patient, which 3D volume is defined by a three-dimensional set of data representing voxel values of a 3D array of voxels of the 3D volume, as a 2D image defined by pixel values of a 2D array of pixels of a 2D image on an imaginary 2D projection screen, the method comprising:
with one or more processors:
casting a ray from each pixel into the 3D volume;
stepping along the ray to each of a plurality of ray positions within the volume under control of a protocol that selects one of a plurality of rendering algorithms/parameters in dependence on (1) the ray position along the ray and (2) the anatomical region of the patient represented by the ray position and (3) a medical or clinical situation;
for some of the ray positions along the ray, selecting different rendering algorithms/parameters than for other ray positions along the ray wherein the selected rendering algorithm/parameter for at least one of the ray position along the ray changes to a different rendering algorithm/parameter;
for each of the plurality of ray positions along the ray using the selected one of the plurality of rendering algorithms/parameters to calculate a contribution to the pixel value of the pixel of the 2D image that corresponds to the ray; and
at least one of displaying the 2D image on a display monitor and storing the 2D image in a computer memory;
wherein the different rendering algorithm/parameter at least one of:
switching a stepping direction along the ray;
jumping forward or backward along the ray to a particular ray position, and resumes processing from that ray position;
changing a step size that determines a next ray position with respect to a current ray position in the stepping direction;
changing a 3-dimensional direction of a ray starting from a current ray position; and
determining a type of anatomical information that is going to be visualized by the rendering algorithm in the 2D image.

12. The method as claimed in claim 11, further including:
referencing a 3D model that models typical anatomical structure in the anatomical region represented by the 3D volume; and
selecting the rendering algorithm/parameter based on the typical anatomical structure predicts at each ray position along the ray.

13. The method as claimed in claim 11, wherein selecting the rendering algorithm is based on at least one of:
processing results at prior ray positions along the ray; and
a 3D model that models anatomical structure represented by the 3D volume.

* * * * *